(12) United States Patent
Miyata

(10) Patent No.: US 8,186,715 B2
(45) Date of Patent: May 29, 2012

(54) AIRBAG, AIRBAG DEVICE, AND VEHICLE

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 244 days.

(21) Appl. No.: 12/642,004

(22) Filed: Dec. 18, 2009

(65) Prior Publication Data

US 2010/0156078 A1     Jun. 24, 2010

(30) Foreign Application Priority Data

Dec. 19, 2008  (JP) .................................. 2008-324019
Dec. 19, 2008  (JP) .................................. 2008-324020
Apr. 28, 2009  (JP) .................................. 2009-109455

(51) Int. Cl.
*B60R 21/205*  (2011.01)
*B60R 21/2338* (2011.01)

(52) U.S. Cl. ................... 280/743.2; 280/730.1; 280/732

(58) Field of Classification Search ............... 280/730.1, 280/743.1, 743.2, 729, 732, 731, 728.2
See application file for complete search history.

(56) References Cited

U.S. PATENT DOCUMENTS

| 6,846,008 | B2 |  | 1/2005 | Kamiji et al. |  |
|---|---|---|---|---|---|
| 7,121,584 | B2 | * | 10/2006 | Hasebe et al. | 280/743.2 |
| 7,152,880 | B1 | * | 12/2006 | Pang et al. | 280/743.2 |
| 7,390,020 | B2 | * | 6/2008 | Hasebe et al. | 280/743.2 |
| 7,540,534 | B2 | * | 6/2009 | Hasebe et al. | 280/743.1 |
| 7,625,008 | B2 | * | 12/2009 | Pang et al. | 280/743.1 |
| 7,712,769 | B2 | * | 5/2010 | Hasebe et al. | 280/729 |
| 7,841,622 | B2 | * | 11/2010 | Pausch et al. | 280/743.2 |
| 2005/0212275 | A1 | * | 9/2005 | Hasebe | 280/743.1 |
| 2006/0103118 | A1 | * | 5/2006 | Hasebe | 280/729 |
| 2010/0102542 | A1 | * | 4/2010 | Nakajima et al. | 280/743.2 |
| 2011/0025024 | A1 | * | 2/2011 | Choi | 280/728.2 |

FOREIGN PATENT DOCUMENTS

| JP |  | 3746193 B2 |  | 6/2002 |
|---|---|---|---|---|
| JP | 2006-103654 A |  |  | 4/2006 |
| JP | 2006-111255 |  | * | 4/2006 |
| JP | 2008-254500 A |  |  | 10/2008 |
| JP |  | 2009006924 A | * | 1/2009 |
| WO | WO 2007055234 A1 | * | 5/2007 |

* cited by examiner

*Primary Examiner* — Paul N Dickson
*Assistant Examiner* — Keith Frisby
(74) *Attorney, Agent, or Firm* — Fitch Even Tabin & Flannery, LLP

(57) ABSTRACT

An airbag comprises a right half airbag to be inflated on a front right side of an occupant, a left half airbag to be inflated on a front left side of the occupant, and a base-end chamber that communicates with base-end sides of the right half airbag and the left half airbag. A vertically extended concave portion exists on a surface of the inflated airbag that faces the occupant. The upper parts of the right half airbag and the left half airbag, and the lower parts of the right half airbag and the left half airbag are stitched together by seams, and the intermediate parts of the right half airbag and the left half airbag are stitched together by a seam. The seam is provided at the deepest location. The concave portion is shallow in the upper part and lower part thereof.

8 Claims, 20 Drawing Sheets

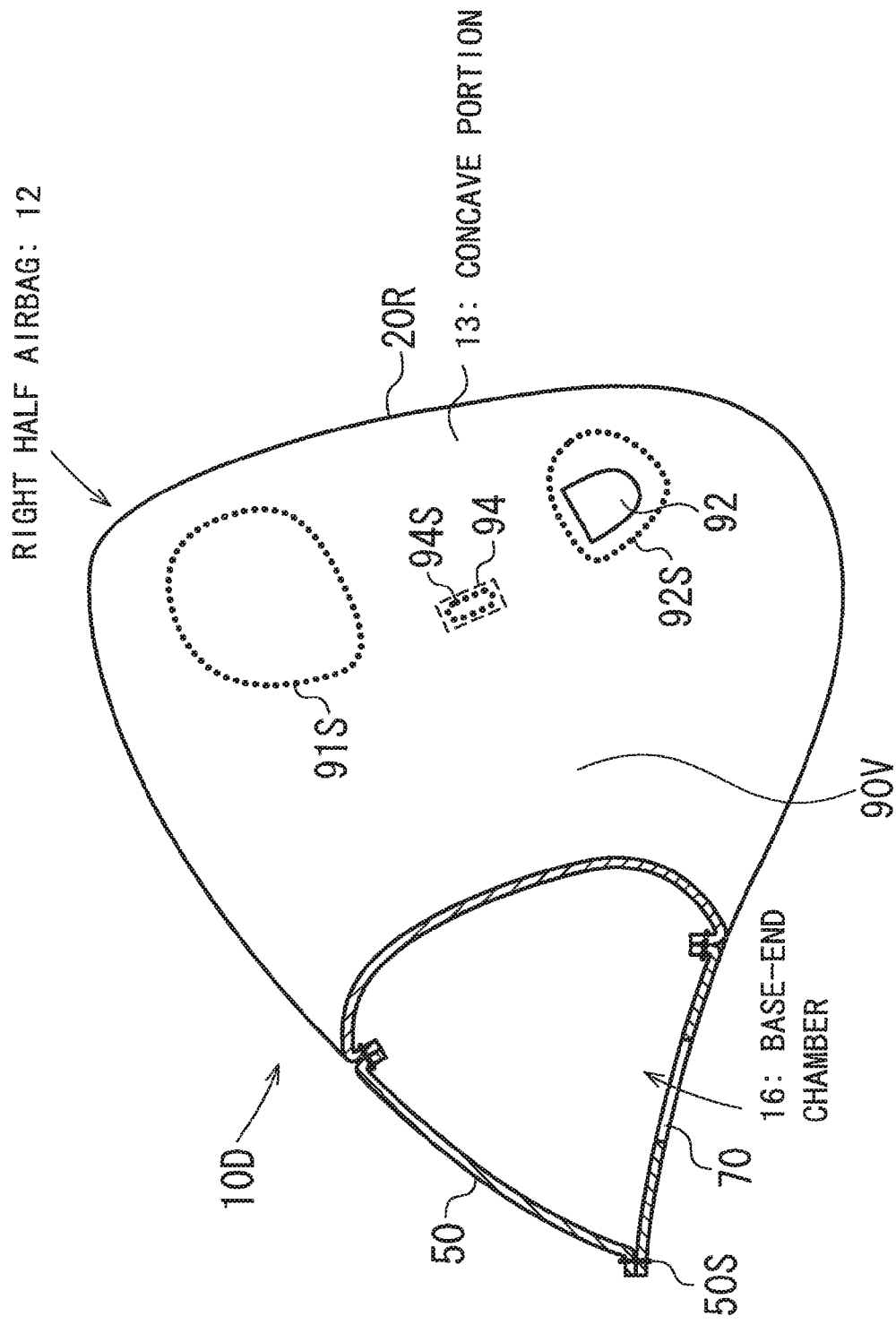

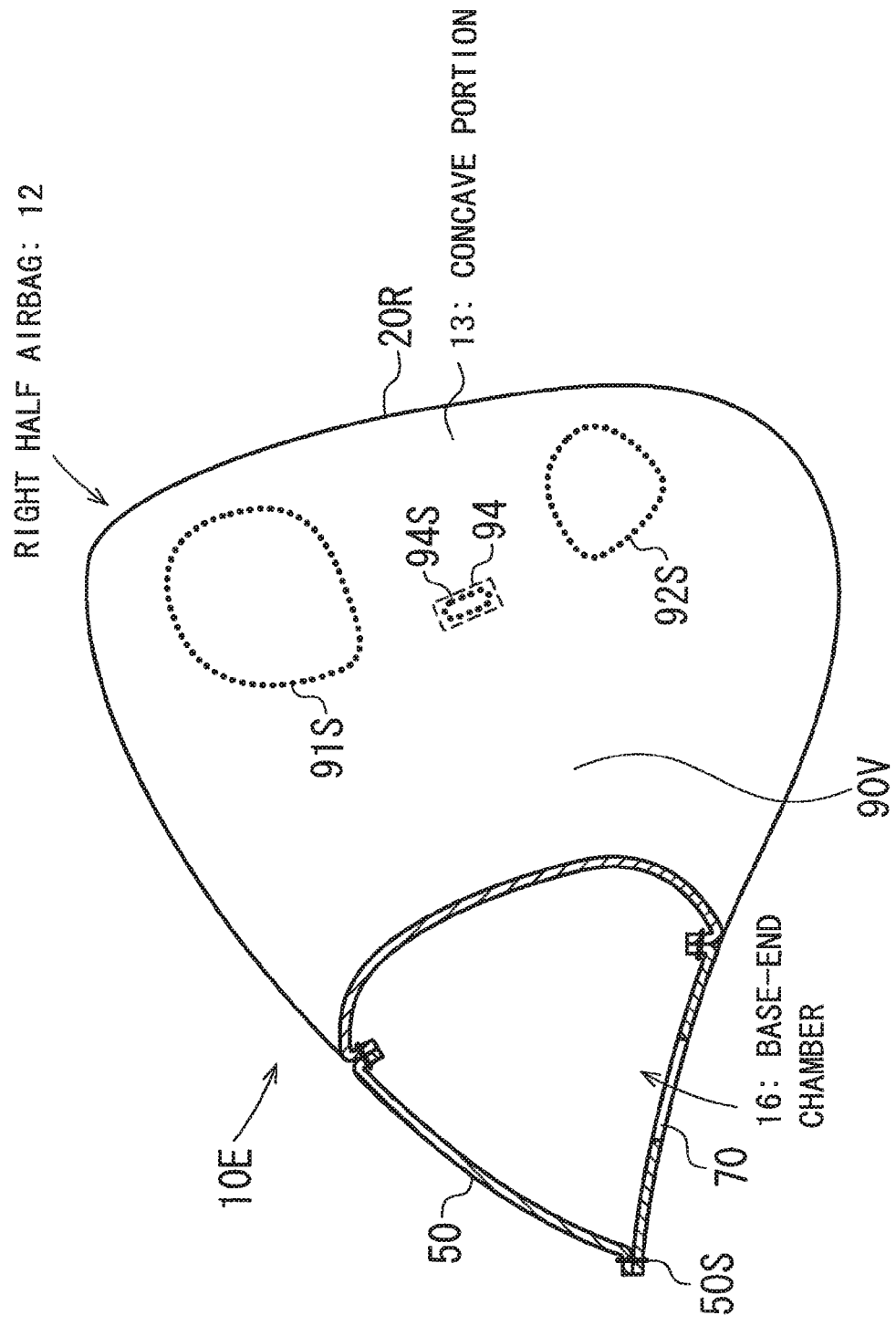

AIRBAG, AIRBAG DEVICE, AND VEHICLE

RELATED APPLICATIONS

This application claims priority under 35 U.S.C. §119 to Japanese Patent Application Nos. JP2008-324019 filed on Dec. 19, 2008, JP2008-324020 filed on Dec. 19, 2008 and JP2009-109455 filed on Apr. 28, 2009, the entire contents of which are hereby incorporated by reference.

FIELD OF THE INVENTION

The present invention relates to an airbag and an airbag device for restraining an occupant in the event of a vehicle collision or the like. More particularly, the present invention relates to an airbag and an airbag device in which a concave portion is formed in the vertical direction on an airbag surface facing the occupant in an inflated state. The present invention also relates to a vehicle provided with this airbag.

BACKGROUND OF THE INVENTION

JP, A, 2006-103654 describes an airbag for restraining an occupant in the event of a vehicle collision or the like, in which a concave portion is formed in the vertical direction on the airbag surface facing the occupant when the airbag is in an inflated state. Paragraph 0039 of the above prior art discloses that, in the event of a frontal collision, the shoulder portion of the occupant is restrained by a shoulder restraining portion located on both sides of the concave portion of the inflated airbag, causing the head portion of the occupant to be restrained as it enters the concave portion.

Further, in this airbag, as shown in FIG. 4, the depth of the concave portion is shallowest in the vertical intermediate part, and gradually deepens upward and downward from this intermediate part.

SUMMARY OF THE INVENTION

It is therefore an object of the present invention to provide an airbag, an airbag device, and a vehicle equipped with this airbag device, suitable for receiving a small occupant in the event of a frontal collision.

In order to achieve the above-mentioned object, according to the first invention, there is provided an airbag comprising: a vertically extended concave portion formed so as to face a front-passenger seat occupant in an inflated state in front of the occupant; a base-end chamber disposed on a vehicle front side; a left half airbag that is continuous with the base-end chamber and is to be inflated on a front left side of the occupant; and a right half airbag that is continuous with the base-end chamber and is to be inflated on a front right side of the occupant; an upper joining portion that joins an upper part of the left half airbag to an upper part of the right half airbag on a vehicle rear side among mutually face-to-face portions of the left half airbag and the right half airbag; and a lower joining portion that joins a lower part of the left half airbag to a lower part of the right half airbag on a vehicle rear side among mutually face-to-face portions of the left half airbag and the right half airbag; the upper joining portion and the lower joining portion being discontinuous.

According to the second invention, in the first invention, the airbag further comprising at least one of an opening that connects the upper part of the left half airbag with the upper part of the right half airbag on a vehicle rear side and the other opening that connects the lower part of the left half airbag with the lower part the right half airbag on the vehicle rear side.

According to the third invention, in the airbag according to the first invention, in the inflated state, a shallowest depth $d_1$ of the concave portion from a surface of the airbag facing the occupant in an upper part of the concave portion is 5 to 200 mm; and in the inflated state, a shallowest depth $d_3$ of the concave portion from the surface facing the occupant in a lower part of the concave portion is 5 to 200 mm.

According to the fourth invention, in the third invention, the airbag further comprises at least one tether for decreasing a width of the left half airbag and a width of the right half airbag along a lateral direction when the left half airbag and right half airbag are inflated, wherein: an end portion of the tether at an airbag center side is stitched by a seam to the left half airbag and the right half airbag; and the left half airbag and the right half airbag are partly joined between the upper joining portion and the lower joining portion by the seam.

According to the fifth invention, in the airbag according to the fourth invention, in the inflated state, a depth $d_2$ from the surface of the airbag facing the occupant to the seam is 20 to 400 mm greater than both the shallowest depth $d_1$ of the upper part of the concave portion and the shallowest depth $d_3$ of the lower part of the concave portion.

According to the sixth invention, in the airbag according to the first invention, the left half airbag and the right half airbag are configured to be pressed together closer to a vehicle front side than the concave portion between the upper joining portion and the lower joining portion, in the inflated state.

According to the seventh invention, in the first invention, the airbag further comprises a hollow portion that passes in the substantially vertical direction through the airbag in the inflated state that the airbag inflates from an instrument panel of the vehicle toward a vehicle rear so as to approach the occupant; wherein: the hollow portion is configured so that, when the airbag is in the inflated state, at least one portion of a lower end side of the hollow portion is positioned closer to a vehicle rear than an end portion of the instrument panel on a vehicle rear side.

According to the eighth invention, there is provided the airbag device having the airbag in the first invention and an inflator that inflates the airbag.

According to the ninth invention, there is provided a vehicle having the airbag device in the 8th invention.

The airbag and airbag device of the present invention comprises a left half airbag to be inflated on a front left side of an occupant, and a right half airbag to be inflated on a front right side of the occupant. Then, the left half airbag and the right half airbag are joined at mutually face-to-face parts to form a vertically extending concave portion on the surface facing the occupant.

When the airbag inflates in the event of a frontal collision, the left half airbag receives the left side of the thorax of the occupant, and the right half airbag receives the right side of the thorax of the occupant. The left and right sides of the thorax have hard strong ribs. The airbag receives and absorbs an impact to the occupant through the ribs. The airbag has a valley-shaped concave portion between the front ends of the left half airbag and the right half airbag, in an inflated state. The vicinity near the breastbones at the thorax center of the occupant faces the concave portion. Accordingly, when the body of the occupant plunges into the airbag, the vicinity of the breastbones does not receive a large reaction force of the airbag. As a result, the load in the vicinity of the breastbones is decreased.

According to the present invention, the vertical intermediate part of the concave portion that extends vertically on the surface facing the occupant is deeper than the upper and lower parts. In a case where a frontal collision occurs when a small occupant is seated in the front-passenger seat, the head portion of the small occupant enters near the intermediate part of the concave portion so that it is sandwiched between both side parts of the concave portion. As a result, the forward moving velocity of the head portion does not suddenly decrease.

When a frontal collision occurs with a large occupant in the front-passenger seat, the head portion of the occupant is received by the concave portion of the airbag upper part, and the left and right sides of the thorax are received by both side parts of the concave portion.

According to an aspect of the present invention, when the airbag is in an inflated state, the left half airbag and the right half airbag are pressed together closer to the vehicle front side than the intermediate part of the concave portion. When the head portion of the occupant comes in contact with this intermediate part in the event of a vehicle collision, the head portion presses apart and enters between the left half airbag and the right half airbag, and the impact is absorbed therebetween.

According to the present invention, the airbag may further include tethers for restricting the horizontal widths of the left half airbag and the right half airbag in the inflated state. With this arrangement, when the airbag is fully inflated, the vehicle rear sides of the left half airbag and the right half airbag protrude toward the occupant. As a result, the lateral width of the concave portion 13 can be decreased. Further, the lateral tethers also make it possible to enlarge the area where the left half airbag and the right half airbag are pressed together.

When the upper parts and/or lower parts of the left half airbag and the right half airbag communicate with each other via an opening, the left half airbag and the right half airbag inflate and deploy equally.

Additionally, the airbag further comprises a hollow portion that passes substantially vertically through the inflated airbag, wherein at least a portion of the lower end of the hollow portion is positioned closer to the vehicle rear than the end portion on the vehicle rear side of the instrument panel when the airbag is inflated. With this arrangement, even if an object is present in the vicinity of the instrument panel, the object becomes engulfed in the hollow portion when the airbag inflates.

BRIEF DESCRIPTION OF THE DRAWINGS

FIG. 16 is a vertical cross-sectional view of the airbag according to an embodiment of the present invention.

FIG. 17 is a vertical cross-sectional view of the airbag according to an embodiment of the present invention.

DETAILED DESCRIPTION OF THE PREFERRED EMBODIMENTS

Embodiments of the present invention will now be described with reference to accompanying drawings.

Figure 1:
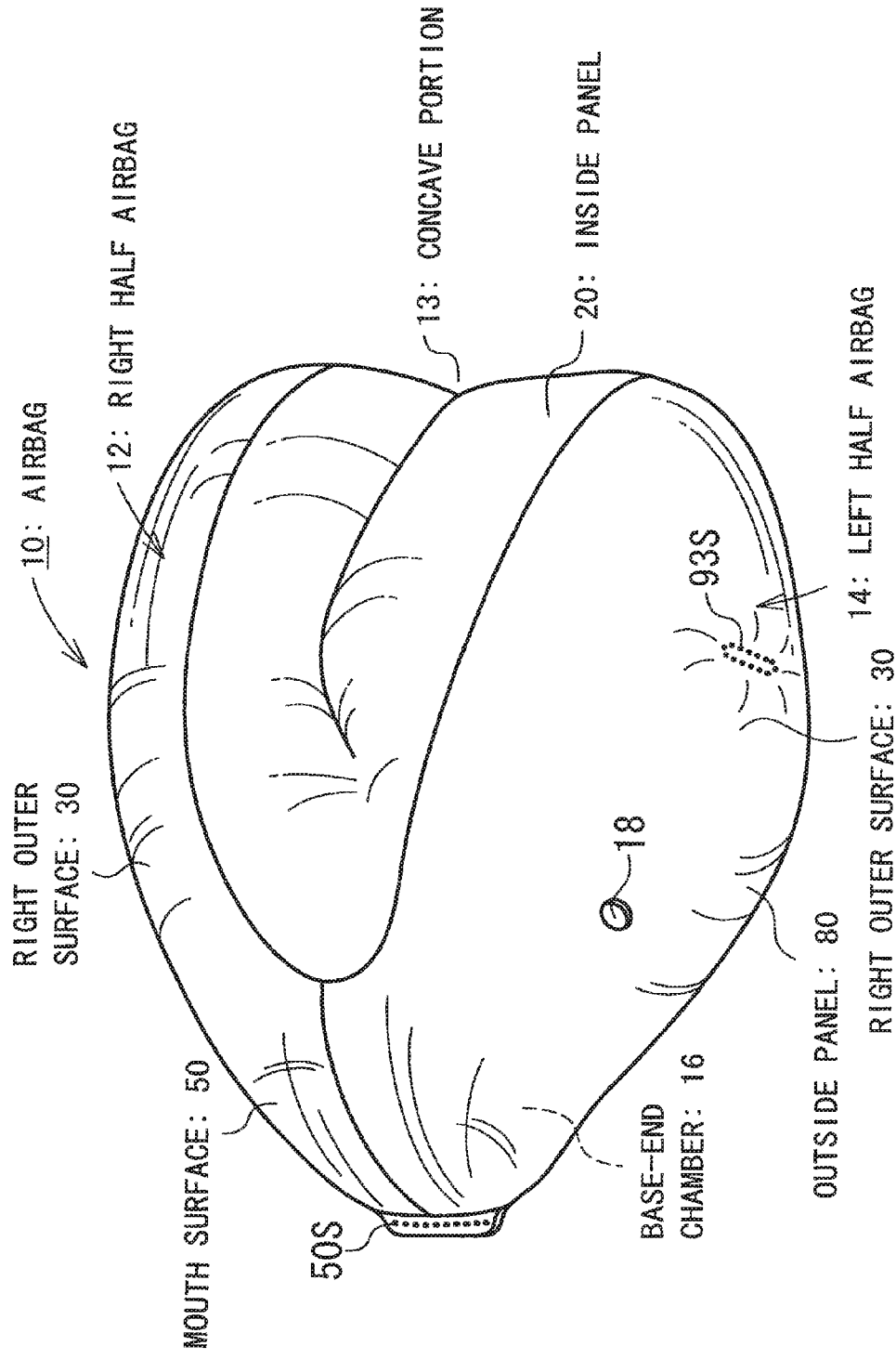
FIG. 1 is a perspective view of an airbag according to an embodiment of the present invention.
Figure 2:
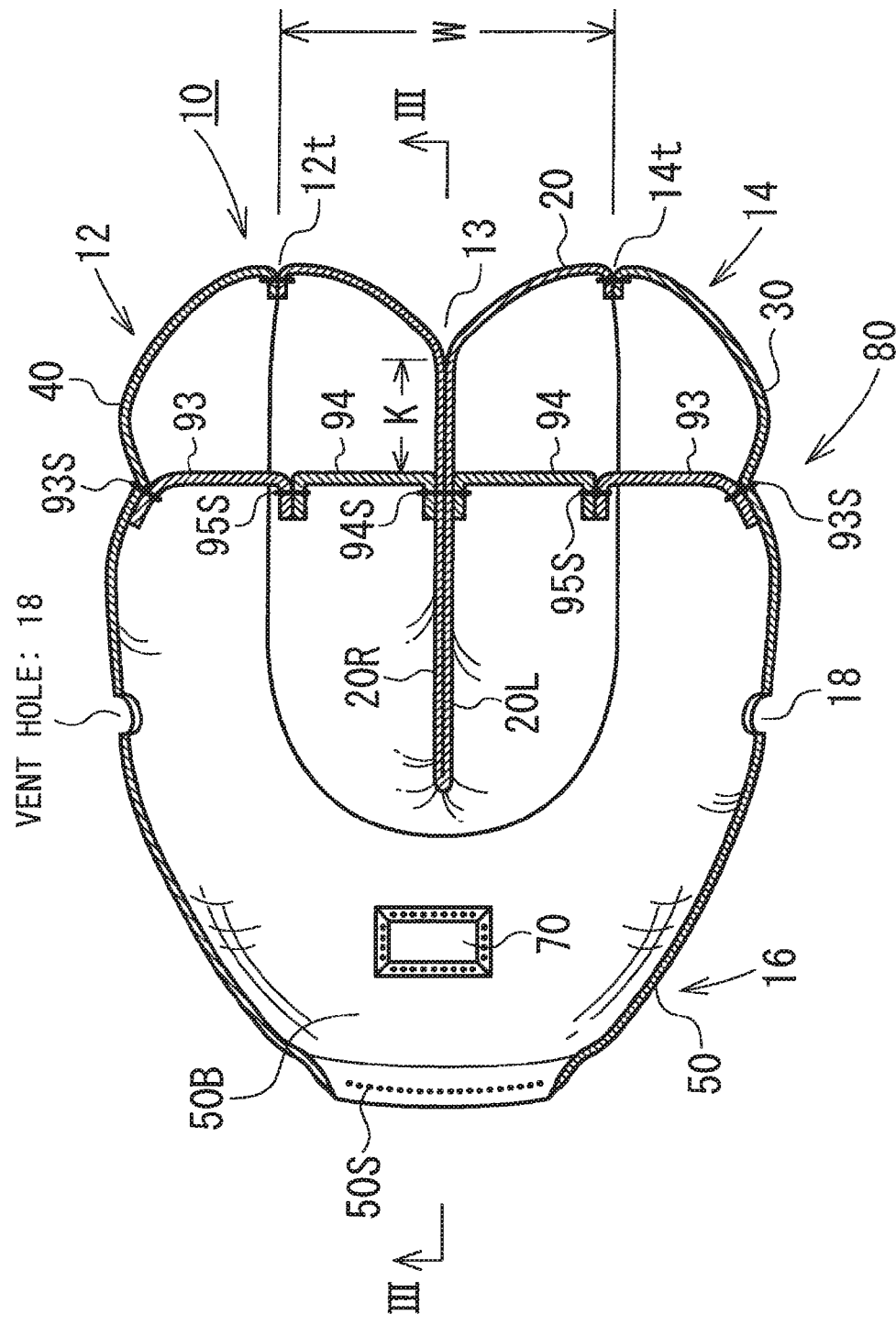
FIG. 2 is a horizontal cross-sectional view of the airbag shown in FIG. 1.
Figure 3:
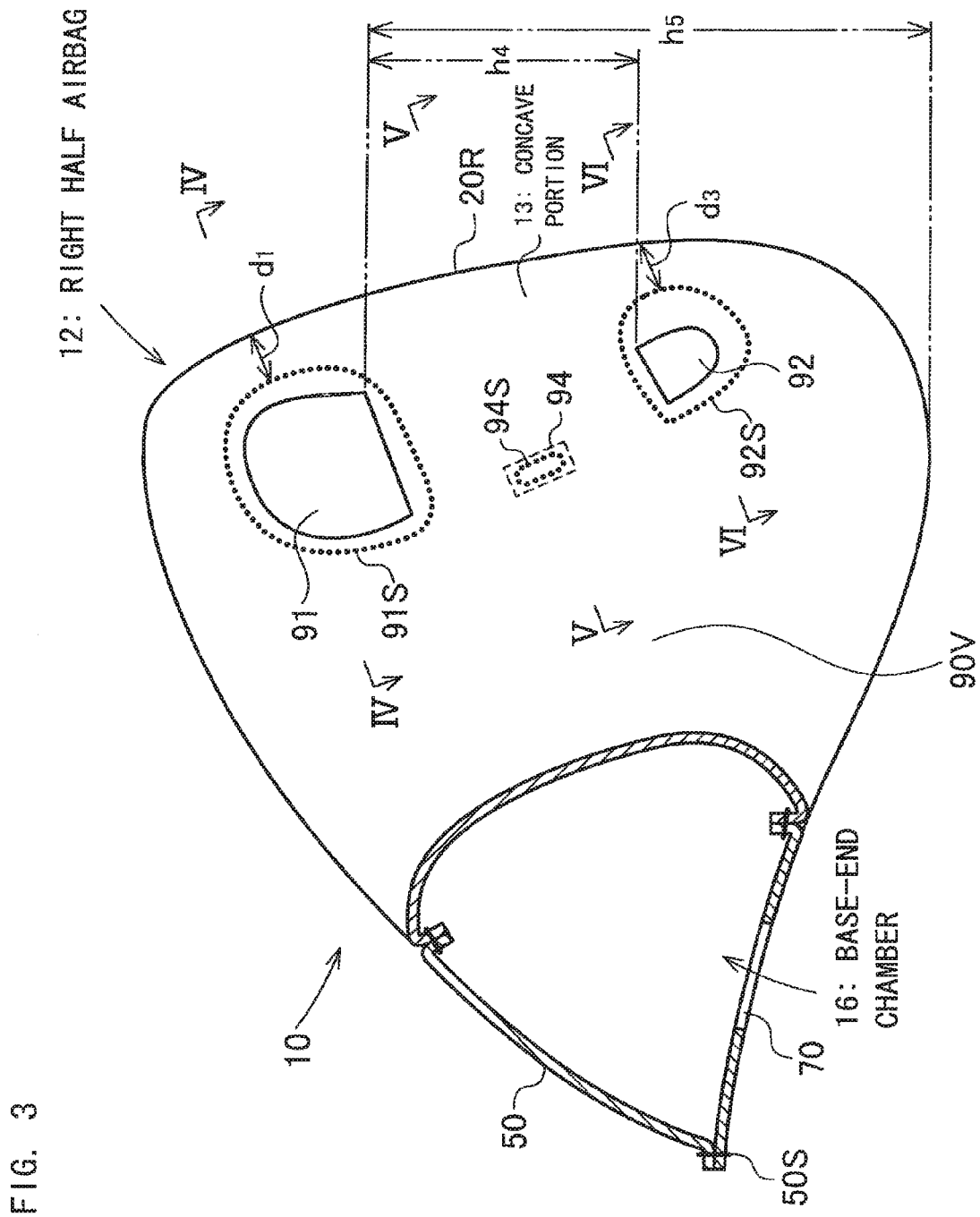
FIG. 3 is a cross-sectional view taken along line III-III in FIG. 2.
Figure 4:
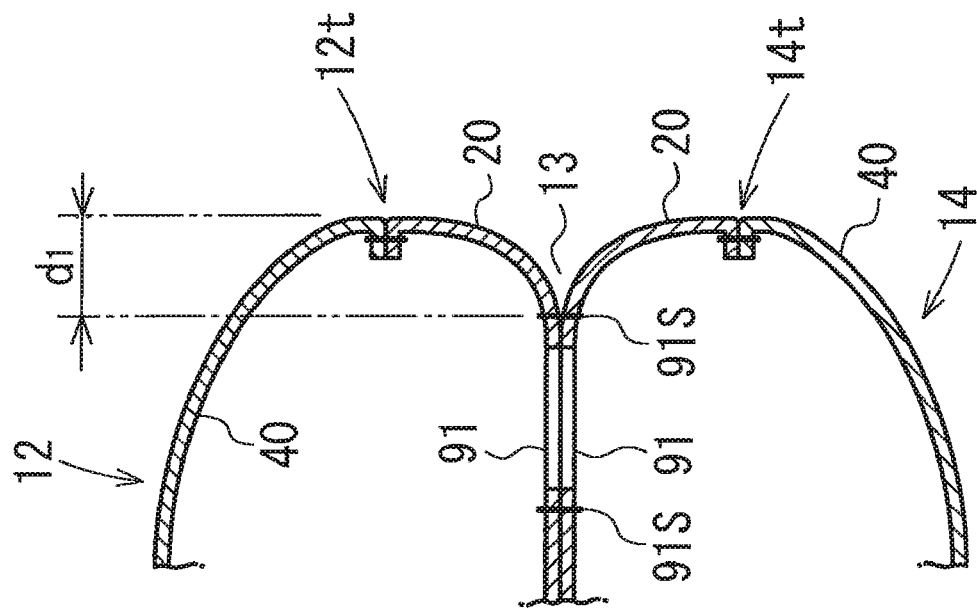
FIG. 4 is a cross-sectional view taken along line IV-IV in FIG. 3.
Figure 5:
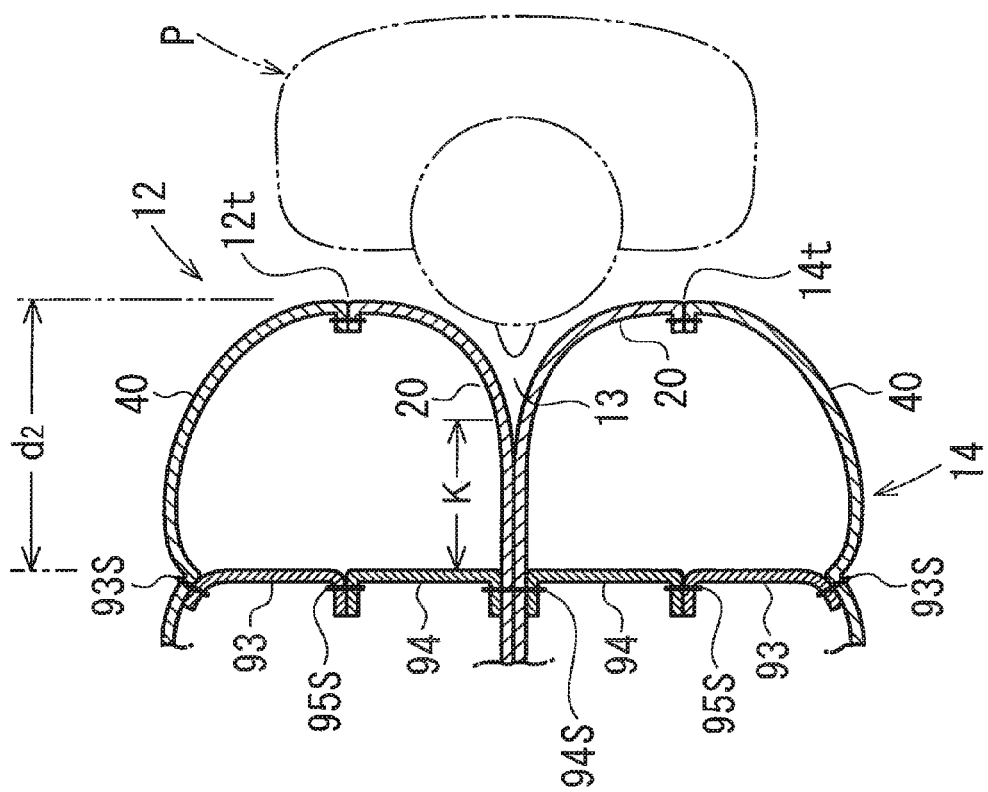
FIG. 5 is a cross-sectional view taken along line V-V in FIG. 3.
Figure 6:
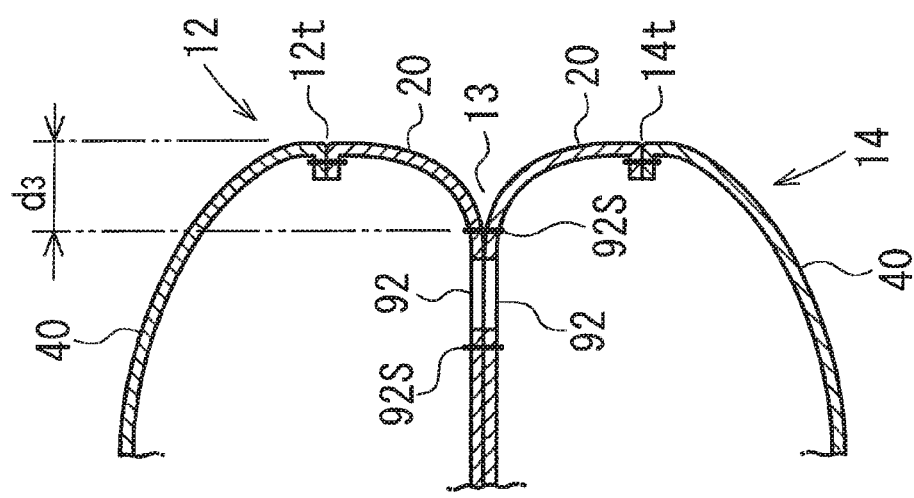
FIG. 6 is a cross-sectional view taken along line VI-VI in FIG. 3.
Figure 7:
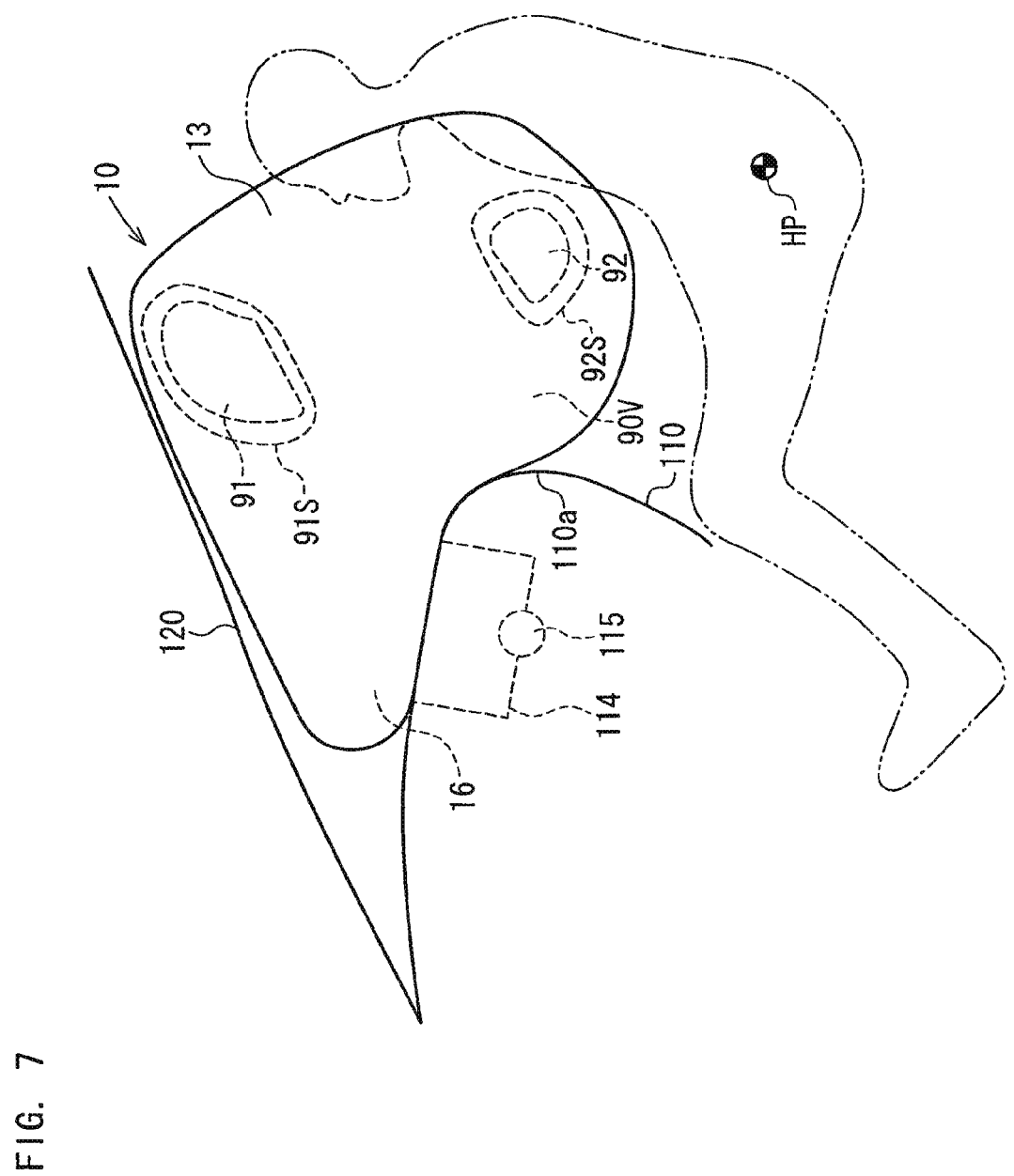
FIG. 7 is a side view of the airbag shown in FIG. 1.
Figure 8:
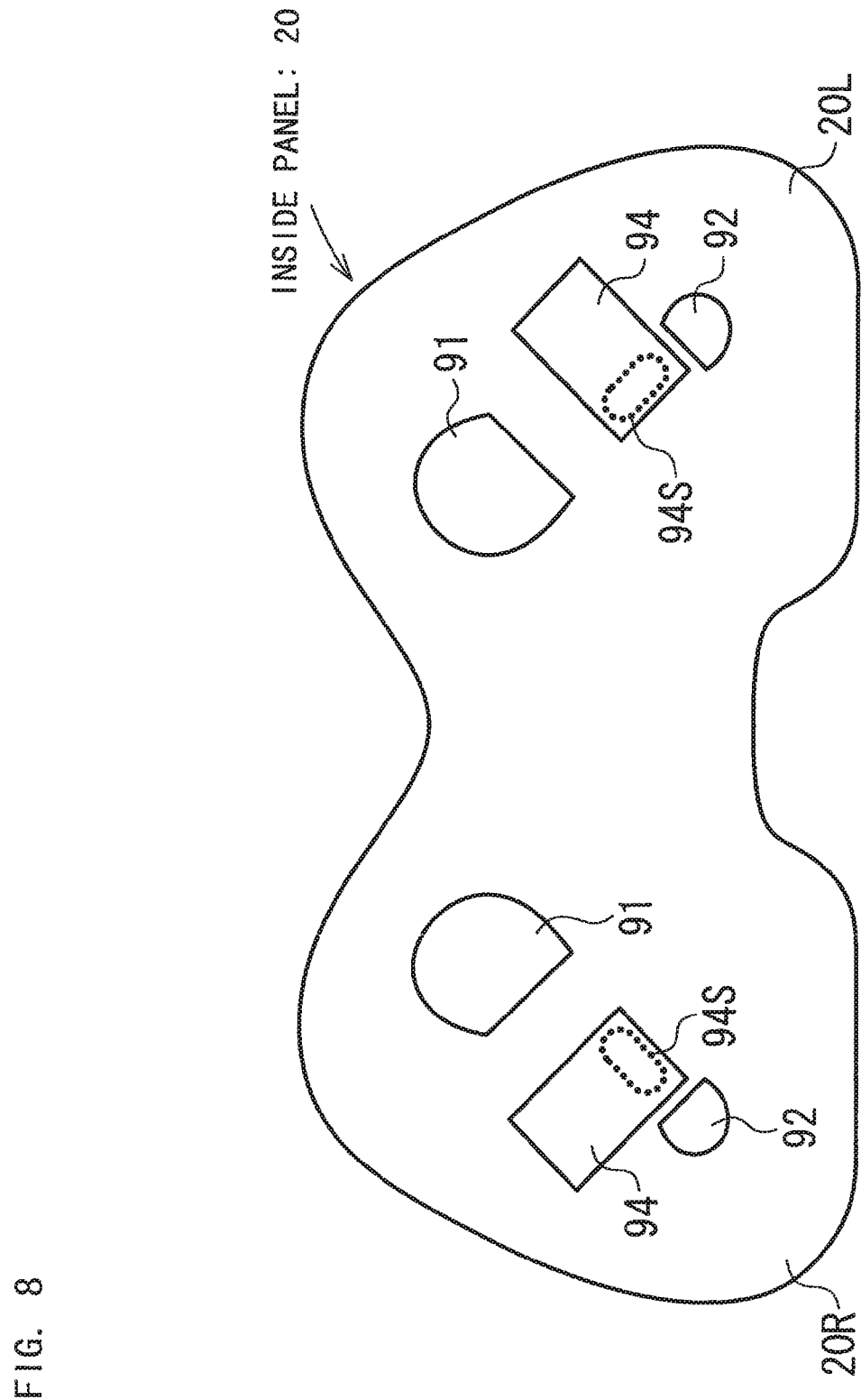
FIG. 8 is a plane view of the inside panel.
Figure 9:
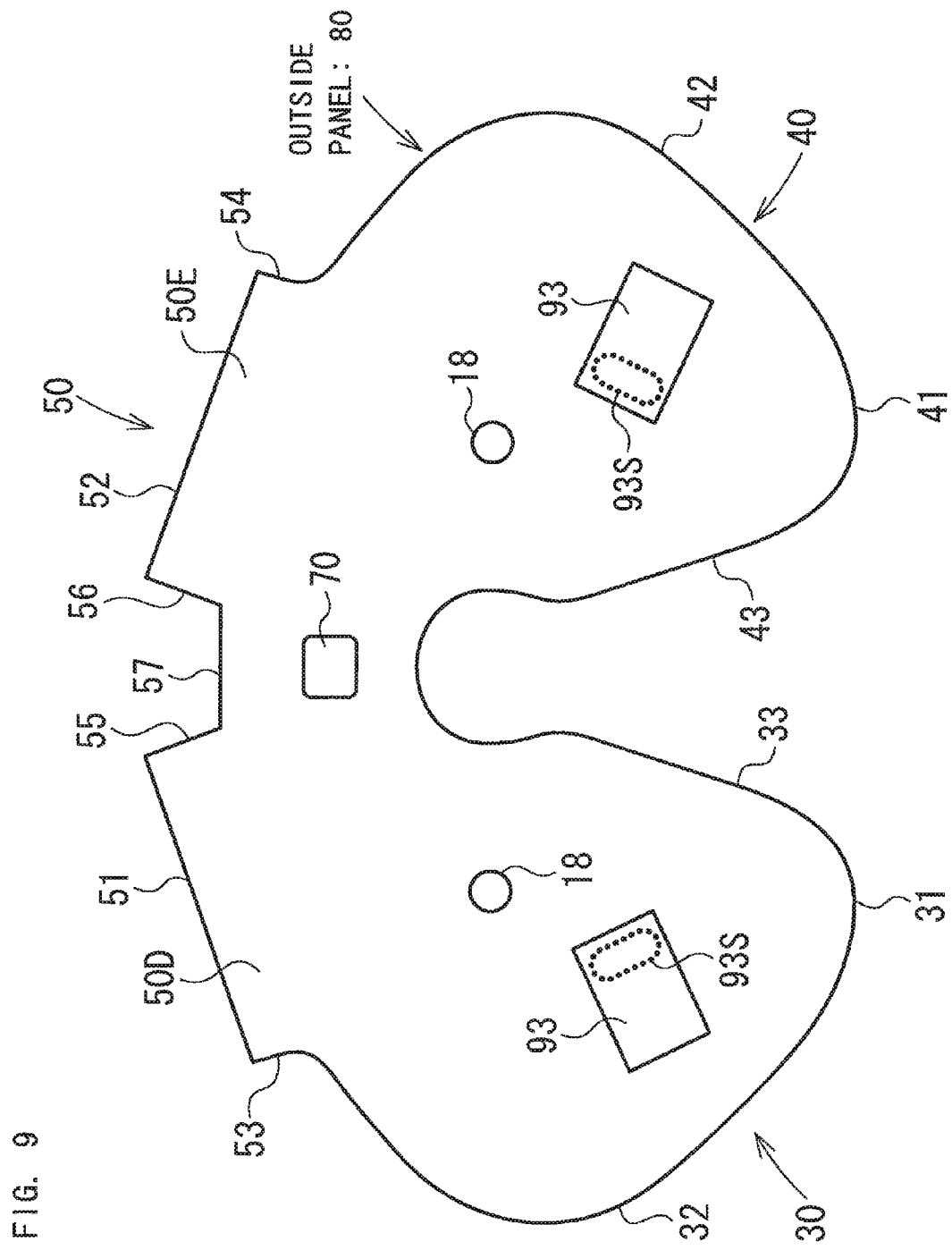
FIG. 9 is a plane view of the outside panel.
Figure 10:
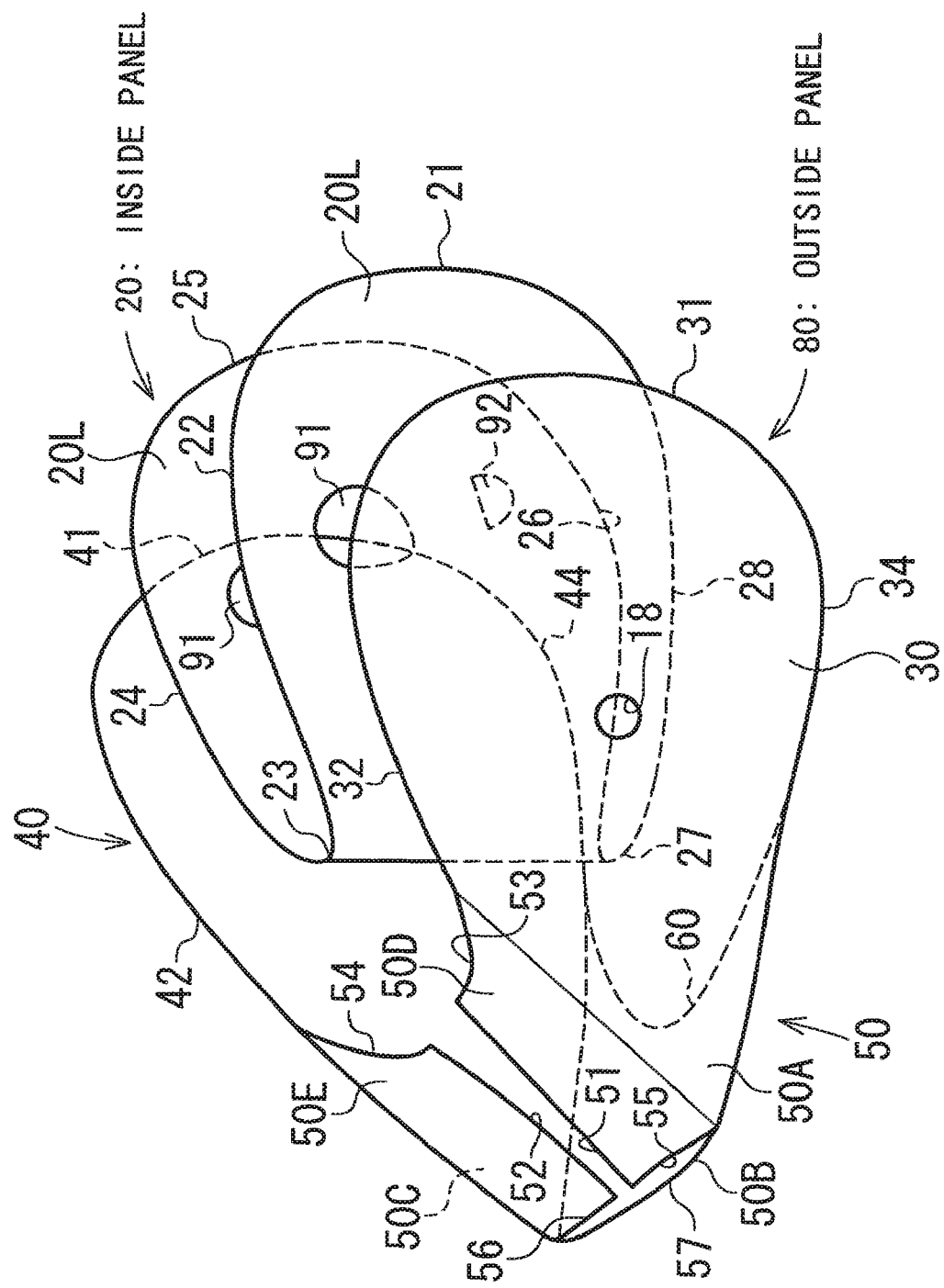
FIG. 10 is an exploded perspective view of the airbag shown in FIG. 1.
Figure 11:
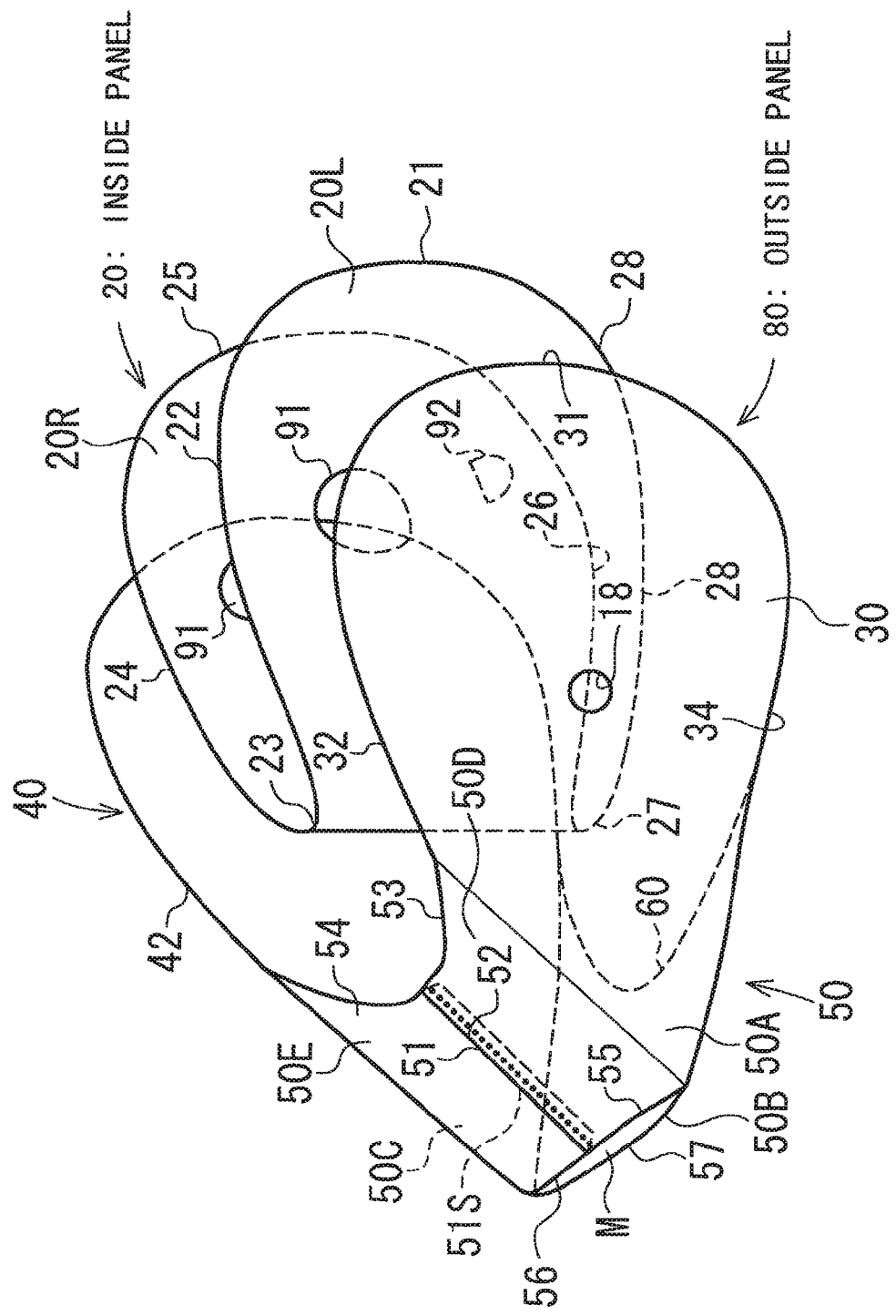
FIG. 11 is an exploded perspective view of the airbag shown in FIG. 1.

FIG. 1 is a perspective view of an airbag in an inflated state from above, according to an embodiment of the present invention. FIG. 2 is a horizontal cross-sectional view of this airbag. FIG. 3 is a cross-sectional view taken along line III-III in FIG. 2, FIG. 4 is a cross-sectional view taken along line IV-IV in FIG. 3. FIG. 5 is a cross-sectional view taken along line V-V in FIG. 3. FIG. 6 is a cross-sectional view taken along line VI-VI in FIG. 3. FIG. 7 is a side view of the inflated airbag. FIG. 8 is a plane view of the inside panel. FIG. 9 is a plane view of the outside panel. FIG. 10 and FIG. 11 are exploded perspective views of this airbag.

An airbag 10 comprises a right half airbag 12 to be inflated on a right front side of an occupant, a left half airbag 14 to be inflated on a front left side of the occupant, and a base-end chamber 16 communicating with the base ends of the right half airbag 12 and the left half airbag 14. The face-to-face surfaces of the left half airbag 14 and the right half airbag 12 are stitched together by a seam 91S, which serves as an upper joining portion, and a seam 92S, which serves as a lower joining portion.

The right half airbag 12 and the left half airbag 14 communicate with each other via a first opening 91 and a second opening 92 provided on each of the face-to-face surfaces. The first opening 91 is provided in the upper part of the airbag 10, and the second opening 92 is provided in the lower part of the airbag 10. The area of the opening 91 is preferably 7500 to 50000 mm$^2$, more preferably about 20000 to 40000 mm$^2$, and the area of the opening 92 is preferably 1200 to 32000 mm$^2$, more preferably about 1900 to 20000 mm$^2$. The seam 91S wraps around the opening 91, and the seam 92S wraps around the opening 92.

When the airbag 10 is inflated, there is no bridge member such as a tie panel between the front ends of the right half airbag 12 and the left half airbag 14, and a vertically extending concave portion 13 is formed between the front ends of the right half airbag 12 and the left half airbag 14. This concave portion 13 opens toward the occupant (i.e., toward the right in FIG. 1 to FIG. 7). In the upper and lower parts of the airbag 10, the inmost parts of the concave portion 13 are the seams 91S and 92S.

When this airbag 10 is fully inflated, as shown in FIG. 2, a distance W between a front-most end 12t of the right half airbag 12 and a front-most end 14t of the left half airbag 14 is preferably 150 to 450 mm, more preferably 170 to 430 mm.

According to this embodiment, connecting bands 93 and 94 that extend in the horizontal direction of the airbag 10 are provided near the vertical middle and the front-back middle of the right half airbag 12 and the left half airbag 14, respectively. These connecting bands 93 and 94 restrict the lateral widths of the right half airbag 12 and the left half airbag 14 at the time of inflation. With this arrangement, the front end portions close to the occupant of each of the bags 12 and 14 are made to further protrude in the direction of the occupant, making it possible to further deepen the concave portion 13. Further, restricting the distance W between the front-most end 12t of the right half airbag 12 and the front-most end 14t of the left half airbag 14 makes it possible to reliably restrain the ribs of the occupant by these airbags 12 and 14, thereby minimizing the load on the breastbones.

The connecting bands 93 and 94 are connected by a seam 95S, thereby constituting a single tether. The end portion of each tether at the airbag center is connected to the mutually face-to-face surface of the right half airbag 12 and the left half airbag 14 by a seam 94S. The other end portion of each tether is connected to outer surfaces 30 and 40 of the right half airbag 12 and the left half airbag 14, respectively, by a seam 93S.

A vent hole 18 is provided on the outer surfaces of the right half airbag 12 and the left half airbag 14, i.e., on the right outer surface 40 and the left outer surface 30.

As shown in FIG. 4 to FIG. 6, with the airbag 10 fully inflated, the shallowest depth $d_1$ of the concave portion 13 of the right half airbag 12 and the left half airbag 14 in the upper part of the concave portion 13 is preferably 5 to 200 m, more preferably 30 to 170 mm. Similarly, with the airbag 10 fully inflated, the shallowest depth $d_3$ of the concave portion 13 in the lower part of the concave portion 13 is preferably 5 to 200 mm, more preferably 30 to 170 mm.

In the concave portion 13, the intermediate part between the upper seam 91S and the lower seam 92S is a deep concave portion. In this deep concave portion, when the airbag 10 is inflated, the right half airbag 12 and the left half airbag 14 are pressed together. The seam 94S is positioned in this part that is pressed together While a portion of the intermediate part of the concave portion 13 terminates as a result of this seam 94S, the concave portion 13 reaches the base-end chamber 16 between this seam 94S and the seams 91S and 92S.

When the airbag 10 is inflated, a depth $d_2$ (refer to FIG. 5) from the surface facing the occupant to the seam 94S is preferably 25 to 600 mm, more preferably about 50 to 450 mm.

Further, when the airbag 10 is inflated, the length of a part K where the right half airbag 12 and the left half airbag 14 are pressed together, between the seam 94S and the surface facing the occupant (i.e., the length in the depth direction of the concave portion 13) is preferably 10 to 300 mm, more preferably about 40 to 200 mm.

With this airbag 10 fully inflated, a height $h_5$ (refer to FIG. 3) from the lowest part of the airbag 10 to the lower edge of the first opening 91 (preferably the end portion of the lower edge closer to the occupant of the first opening 91) is preferably 200 to 670 mm. A height $h_4$ from the upper edge of the second opening 92 to the lower edge of the first opening 91 is preferably 80 to 400 mm, more preferably about 150 to 300 mm.

The panel configuration of this airbag 10 will now be described with reference to FIG. 8 to FIG. 11. FIG. 10 and FIG. 11 are exploded perspective views of each panel of the airbag 10.

The outer shell of the airbag 10 comprises an inside panel 20 and an outside panel 80.

The inside panel 20 is a substantially guitar-shaped long and narrow panel, which is folded at the center into a right side 20R and a left side 20L, as shown in FIGS. 10 and 11. The right side 20R forms an inner surface of the right half airbag 12, and the left side 20L forms an inner surface of the left half airbag 14. A periphery of the inside panel 20 is formed from the left side 20L having a lower side 28, a front-end side 21, an upper side 22, and an upper side 23 in the vicinity of a folded portion, and the right side 20R having an upper side 24, a front-end side 25, a lower side 26, and a lower side 27 in the vicinity of the folded portion.

As shown in FIG. 9 to FIG. 11, the outside panel 80 comprises the right outer surface 40 that forms an outer surface of the right half airbag 12, the left outer surface 30 that forms an outer surface of the left half airbag 14, and a mouth surface 50 that forms the base-end chamber 16.

The side edges of the outer periphery of the left outer surface 30 and the right outer surface 40 are formed by front-end sides 31 and 41, upper sides 32 and 42, and lower side 34 and 44.

The mouth surface 50 has a left-side surface 50A, a bottom 50B, a right-side surface 50C, a left flap 50D forming an upper left side, and a right flap 50E forming an upper right side. The base end of the left outer surface 30 continues to the left side surface 50A, and the base end of the right outer surface 40 continues to the right side surface 50C. The mouth surface 50 is folded to make the side surfaces 50A and 50C substantially triangular and is open to the front end of the airbag.

A periphery of the mouth surface 50 is formed from face-to-face sides 51 and 52 of the substantially rectangular flaps 50D and 50E, respective rear sides (flap rear sides) 53 and 54 of the flaps 50D and 50E, respective front sides 55 and 56 of the flaps 50D and 50E, a front side 57 facing the front sides 55 and 56, and a rear side (bottom rear side) 60 of the bottom 50B.

The flap rear sides 53 and 54 are respectively connected to the upper sides 32 and 42 of the left outer surface 30 and the right outer surface 40. Both end sides of the bottom rear side 60 are respectively connected to the lower sides 34 and 44 of the left outer surface 30 and the right outer surface 40.

The opening 91 for communicating the interiors of the left half airbag 14 and the right half airbag 12 with each other is provided on each of the upper parts of the left side 20L and the right side 20R of the inside panel 20. Additionally, the opening 92 for communicating the interiors of the left half airbag 14 and the right half airbag 12 with each other is provided on each of the lower parts of the left side 20L and the right side 20R.

The base ends of the connecting bands 94 are stitched together by the seam 94S between the openings 91 and 92 of the left side 20L, and between the openings 91 and 92 of the right side 20R.

The base ends of the connecting bands 93 are stitched by the seam 93S at a position facing the connecting band 94 of the outside panel 80.

Note that in FIGS. 10 and 11 the connecting bands 93 and 94 have been omitted for clarity of illustration.

A mouth 70, which is an opening for introducing gas from an inflator 115 (refer to FIG. 7), is provided in the lateral center part of the outside panel 80.

To manufacture this airbag 10, as shown in FIGS. 10 and 11, first the face-to-face sides 51 and 52 of the flaps 50D and 50E of the mouth surface 50 are stitched together. Reference numeral 51S of FIG. 11 denotes this stitched seam.

Next, the inside panel 20 is folded into two so that the left side 20L and the right side 20R thereof overlap. Subsequently, both of the sides 20L and 20R are stitched together by the seam 91S that wraps around the opening 91 and the seam 92S that wraps around the opening 92. Then, the left outer surface 30 of the outside panel 80 and the left side 20L of the inside panel 20 are faced. In this face-to-face state, the front-end sides 21 and 31, the upper sides 22 and 32, and the lower sides 28 and 34 are stitched together, respectively. Further, the right outer surface 40 of the outside panel 80 and the right side 20R of the inside panel 20 are faced, and the front-end sides 25 and 41, the upper sides 24 and 42, and the lower sides 26 and 44 are stitched together, respectively. The flap rear sides 53 and 54 of the mouth surface 50 of the outside panel 80 are stitched in the vicinity of the upper side 23 in the folded portion of the inside panel 20. The bottom rear side 60 of the mouth surface 50 and the lower side 27 in the folded portion are stitched together.

Subsequently, the front ends of the connecting bands 93 and 94 are stitched together by the seam 95S (refer to FIGS. 2 and 5).

As a result of this stitching, the airbag 10 (refer to FIG. 1) is in a reversed state, i.e., a state in which the seam allowances are exposed on the surface of the airbag. As shown in FIG. 11, the flap front sides 55 and 56 of the mouth surface 50 and the front side 57 are not yet stitched together, and instead form an opening M in this state.

Then, the airbag is turned inside out through the opening M. This opening M is stitched by a seam 505 (refer to FIGS. 1 and 2) to form the airbag 10 of FIG. 1.

As shown in FIG. 2, the bottom 50B of the base-end chamber 16 has the opening (mouth) 70 for gas introduction from the inflator 115 (refer to FIG. 7).

The airbag 10 has an outer shell formed by the two panels 20 and 80, making stitching easy.

The airbag 10 is mounted to a front-passenger airbag device for restraining a front-passenger seat occupant of a vehicle in the event of a vehicle collision.

As shown in FIG. 7, the front-passenger seat airbag device comprises a case (container) 114 disposed on the top surface of an instrument panel 110, for housing the airbag 10, the inflator 115 for inflating the airbag 10, and the like. The inflator 115 is disposed in the case 114. The airbag 10 is housed in the case 114 in a folded condition. Then, a lid is mounted to the case to cover the folded airbag 10. The lid is torn and opened by a pressure from the airbag 10 when the airbag 10 is inflated. Reference numeral 120 of FIG. 7 denotes a windshield.

The operation of this airbag device will now be described.

When a vehicle equipped with this airbag device is involved in a collision, the inflator 115 is activated to eject gas. The gas from the inflator 115 first inflates the base-end chamber 16 and then flows into the right half airbag 12 and the left half airbag 14 to inflate them.

In the airbag 10, the base-end chamber 16 that was first inflated contacts the upper surface of the instrument panel 110 to become stable in position. As a result, the right half airbag 12 and the left half airbag 14 are stable in position not only after the inflation but also during the inflation.

The gas is supplied from the inflated base-end chamber 16 to the right half airbag 12 and the left half airbag 14 substantially equally. The front ends of the right half airbag 12 and the left half airbag 14 communicate with each other via the openings 91 and 92. Therefore, both the right half airbag 12 and the left half airbag 14 are inflated smoothly and substantially symmetrically from the early stage of inflation. When the openings 91 and 92 are not provided, for example, the inner pressure of the right half airbag 12 and the inner pressure of the left half airbag 14 become uneven, causing the inflated states of the right half airbag 12 and the left half airbag 14 to be uneven. This may potentially lead to unstable deployment behavior of the airbag 10. Nevertheless, with the openings 91 and 92 provided as described above, uneven deployment of the right half airbag 12 and the left half airbag 14 is suppressed, thereby suppressing any sudden horizontal oscillation or neck swings during inflation.

When the airbag 10 is fully inflated, the vertically extended concave portion 13 is formed at the lateral center of the surface facing the occupant. That is, the vertically extended valley-shaped concave portion 13 is formed between the front ends of the right half airbag 12 and the left half airbag 14 to face the occupant. Then, the inflated right half airbag 12 receives the right side of the thorax, the inflated left half airbag 14 receives the left side of the thorax, and the concave portion 13 faces the vicinity of the breastbones of an occupant P seated in the lateral center of the front-passenger seat. Therefore, the reaction force applied near the breastbones during reception of the airbag decreases. The head portion enters and is received by the concave portion 13.

With this airbag 10, the depth $d_2$ of the vertical intermediate part of the concave portion 13 to the seam 94S is deeper than the depth $d_1$ of the upper part and the depth $d_3$ of the lower part. When a small occupant of about the FMVSS AF05 percentile is seated in the front-passenger seat and a frontal collision occurs, the head portion of this small occupant is received by the concave portion 13 having a deep intermediate part. The left and right sides of the thorax and the shoulder vicinity of the occupant are received by the lower parts of the right half airbag 12 and the left half airbag 14 as described above. The mass of a small occupant is low. As a result, when a seatbelt is worn, the restraining force of the shoulder webbings of the seatbelt takes effect, resulting in a relatively low forward moving velocity of the thorax of the small occupant. The head portion of the small occupant moves forward at a relatively high velocity compared to the thorax. This head portion enters the vicinity of the intermediate part of the concave portion 13, and is sandwiched by the right half airbag 12 and the left half airbag 14 from both sides. As a result, the forward moving velocity of the head portion does not suddenly decrease, making it possible for the thorax and head portion to move forward and press into the airbag 10 while behaving in substantially the same manner. With this arrangement, the force applied to the neck of the small occupant is minimized.

According to this embodiment, in the deep region K of the intermediate part of the concave portion 13, in an area closer to the occupant than the seam 94S, there exists a closely contacting part K where the inflated right half airbag 12 and left half airbag 14 are pressed together. The head portion of the occupant P enters the closely contacting region K when a frontal collision occurs, and moves forward while pressing apart the right half airbag 12 and the left half airbag 14, causing the impact to be absorbed therebetween.

When a large occupant of about the FMVSS AM50 percentile (an average frame of an American male adult) is seated in the front-passenger seat and a frontal collision occurs, the head portion of the occupant is received by the upper part of the surface of the airbag 10 facing the occupant. Additionally, the thorax and shoulders of the occupant are received by the vertical intermediate part of the airbag 10. The large occupant has high mass, and therefore moves forward with a greater amount of energy than the small occupant. In the upper part of the airbag 10, the concave portion 13 is shallow. As a result, when the head portion enters the concave portion 13, the left and right sides of the thorax and the shoulders come in contact with the right half airbag 12 and the left half airbag 14 at substantially the same time. Then, the head portion, thorax, and shoulders move forward while pressing into the airbag 10 as one. Since the concave portion 13 of the upper part of the airbag 10 is shallow, the front-back stroke of the airbag 10 required to restrain the head portion is maintained and, as a result, the impact applied to the large occupant is absorbed.

Figure 12:
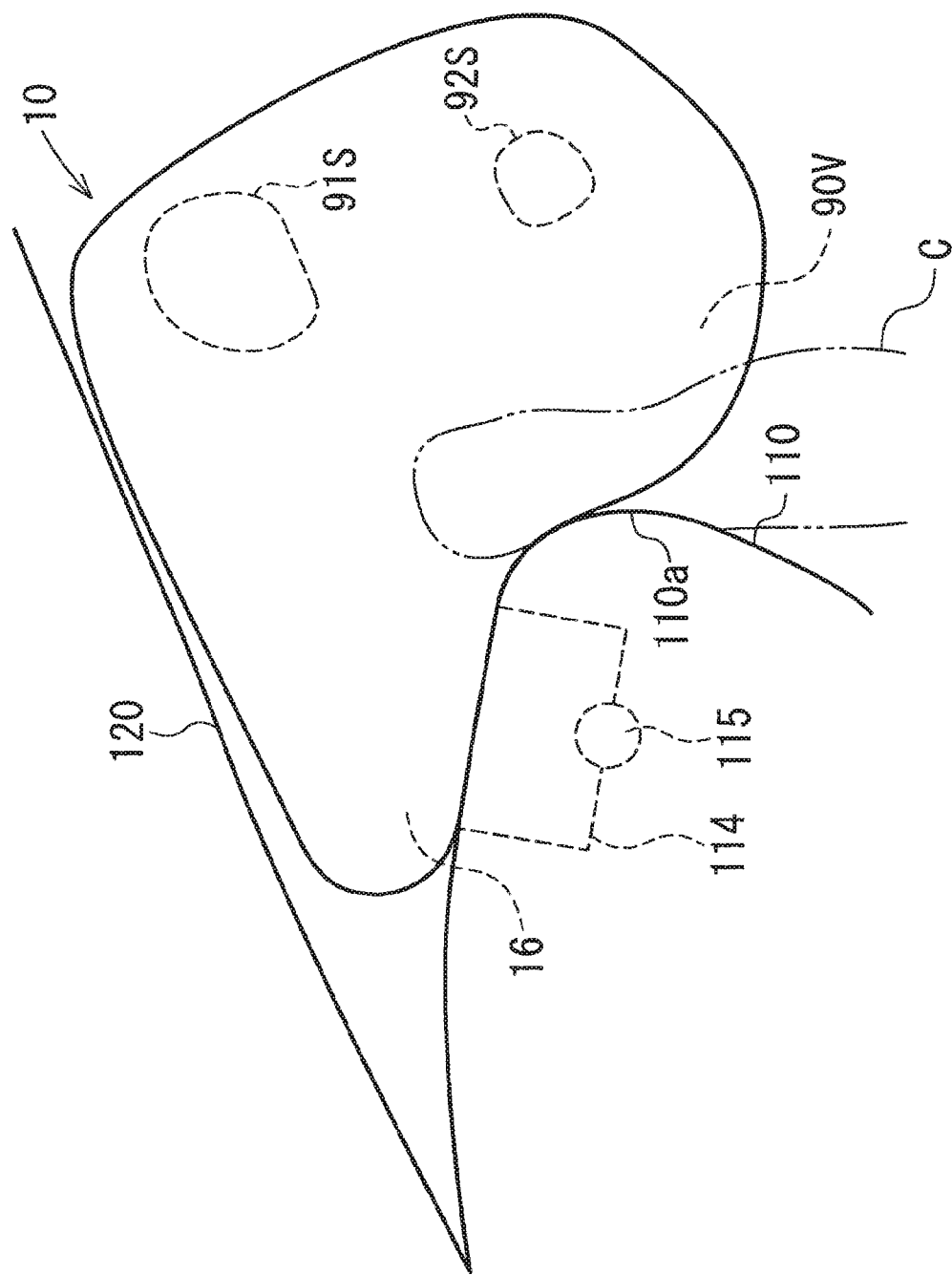
FIG. 12 is a side view of the airbag shown in FIG. 1 in an inflated state.

In this embodiment, as shown in FIG. 3, there exists a hollow portion 90V that passes vertically through the right half airbag 12 and the left half airbag 14 between the seams 91S, 92S, and 94S, and the base-end chamber 16. The hollow portion 90V is formed so that, when the airbag 10 is fully inflated, at least one portion of the lower end of the hollow portion 90V is positioned closer to the vehicle rear side than a rear end portion 110a of the instrument panel 110. That is, with the airbag 10 fully inflated, at least one portion of the opening on the lower end of the hollow portion 90V is exposed on the lower surface of the airbag 10, closer to the vehicle rear than the rear end portion 110a of the instrument panel 110. Therefore, as shown in FIG. 12, even if an object C is present in the vicinity of the instrument panel 110 when the airbag 10 inflates, the object C is engulfed by the hollow portion 90V.

While the right half airbag 12 and the left half airbag 14 have a plane-symmetrical shape in the above embodiment, a plane-asymmetrical shape is also acceptable. Further, the capacity of the right half airbag 12 and the capacity of the left half airbag 14 may be the same or different.

According to the above embodiment, while the seams 91S and 92S wrap around along the edge of the openings 91 and 92, a seam 91S' may extend downward, spreading into a U-shape or V-shape. Further, a seam 92S' may extend upward, spreading into a U-shape or V-shape. The seams 91S' and 92S' may extend to a location near the seam 94S.

Figure 14:
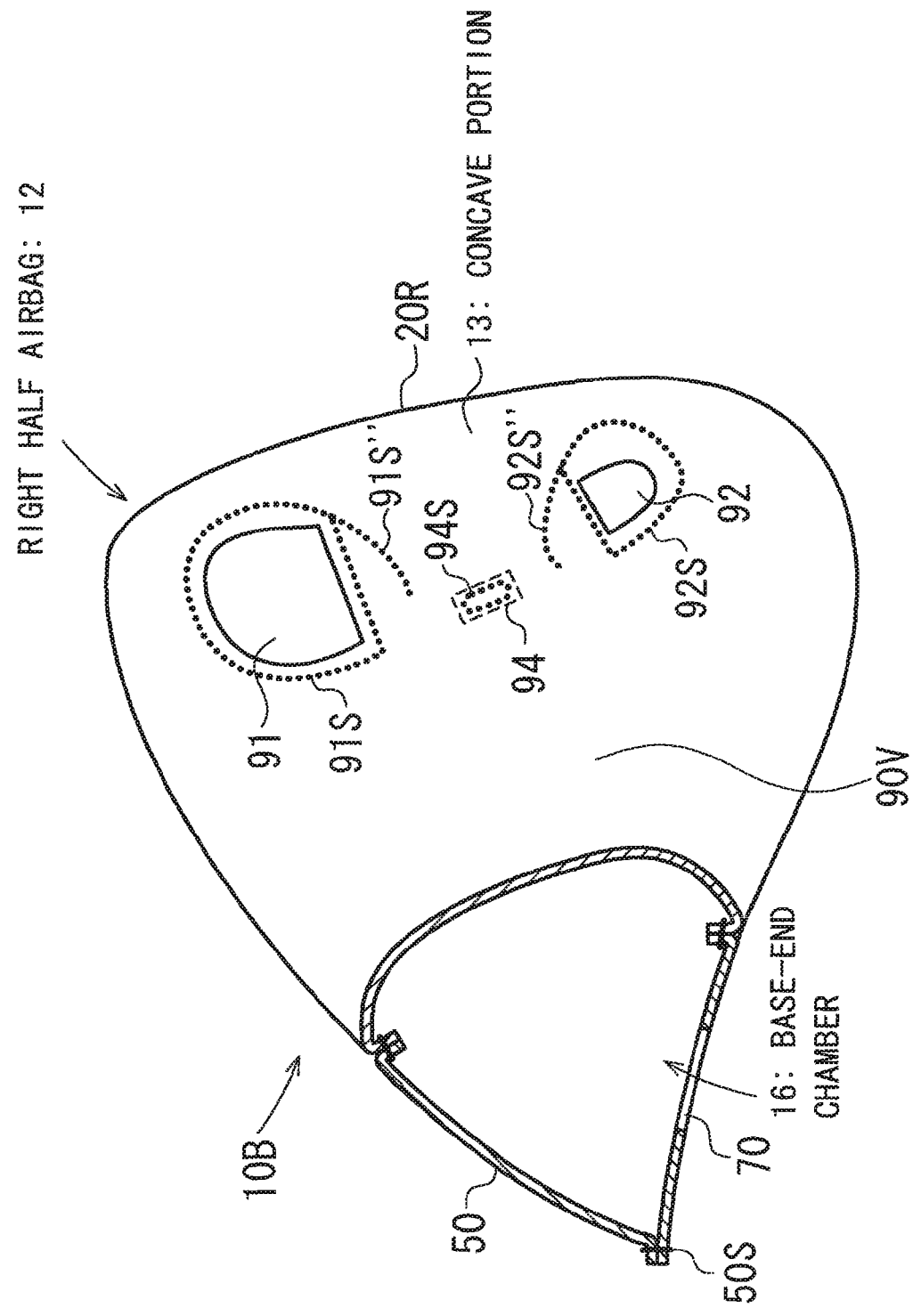
FIG. 14 is a vertical cross-sectional view of the airbag according to an embodiment of the present invention.

Additionally, as in an airbag 10B of FIG. 14, a branch-shaped seam 91S" may extend downward from the seam 91S, and a branch-shaped seam 92S" may extend upward from the seam 92S. The seams 91S" and 92S" may extend to a location near the seam 94S.

Figure 13:
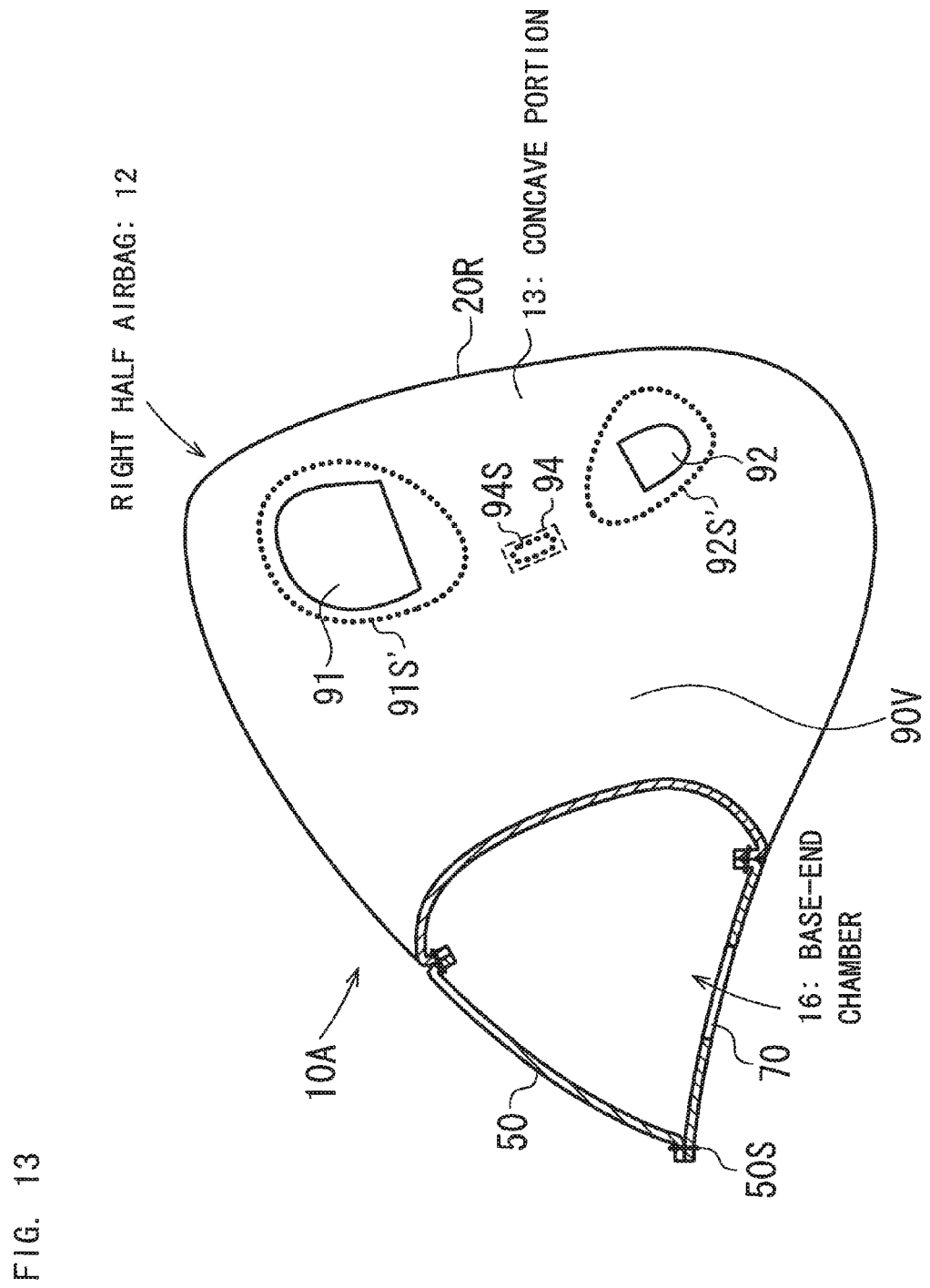
FIG. 13 is a vertical cross-sectional view of the airbag according to an embodiment of the present invention.

Other arrangements in FIGS. 13 and 14 are the same as those in FIG. 3, and the same reference numerals denote the same parts.

While the two openings 91 and 92 are provided in the airbag 10 according to the above embodiment, one or three or more openings may be provided, or the openings may be omitted. The opening size may be other than that described above as well. Such an embodiment will now be described with reference to FIG. 15 to FIG. 17.

Figure 15:
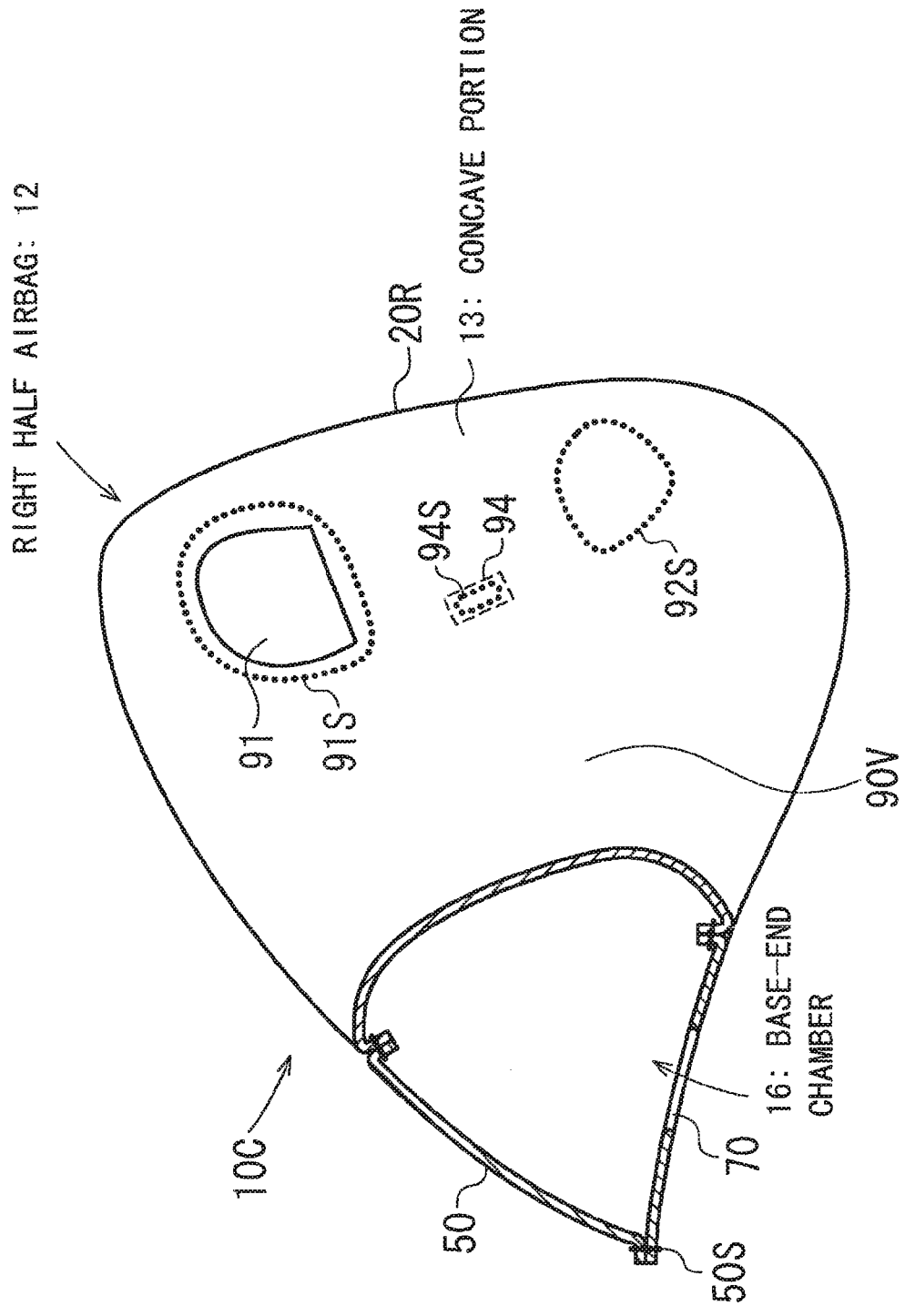
FIG. 15 is a vertical cross-sectional view of the airbag according to an embodiment of the present invention.

An airbag 10C shown in FIG. 15 is an example of omission of the lower part opening 92. An airbag 10D shown in FIG. 16 is an example of omission of the upper part opening 91. An airbag 10E shown in FIG. 17 is an example of omission of the upper part and lower part openings 91 and 92.

Other arrangements in FIG. 15 to FIG. 17 are identical to those in FIG. 3, and the identical reference numerals denote the same components.

While the invention has been explained with reference to the specific embodiments of the invention, the explanation is illustrative and the invention may be practiced in various other forms.

According to the present invention, the connecting bands 93 and 94 which constitute a tether are preferably made of coated fabric, similar to the inside panel 20 and the outside panel 80. This coated fabric, for example, is made of a base cloth formed by a woven fabric of synthetic fiber such as nylon, and coated with a silicon resin or the like on one surface.

When the connecting bands 93 and 94 are formed using such a coated fabric, the resin coated surfaces of the connecting bands 93 and 94 preferably face the vehicle front. With this arrangement, even in a case where the hot gas from the inflator comes in contact with the connecting bands 93 and 94, the heat resistance of the connecting bands 93 and 94 is increased.

Figure 18A:
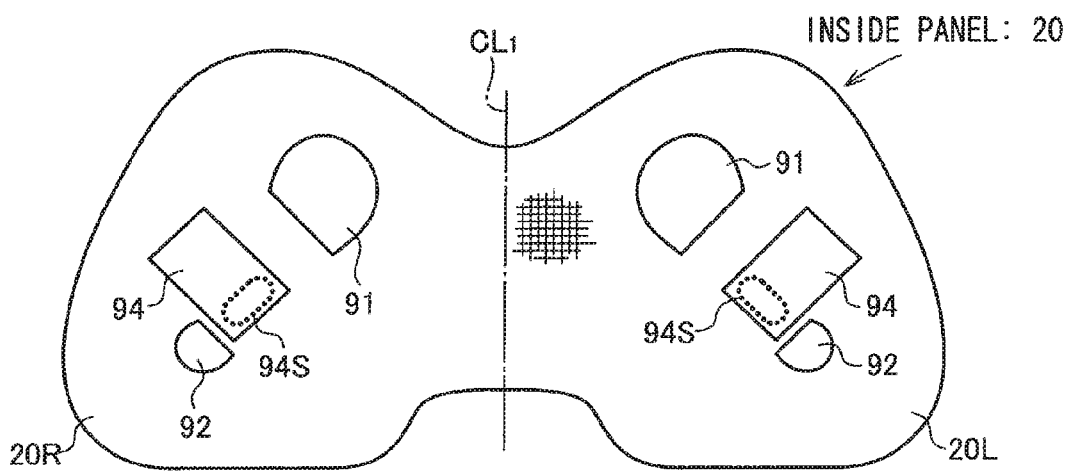
FIG. 18 is a plane view showing the thread line direction of the inside panel.
Figure 18B:
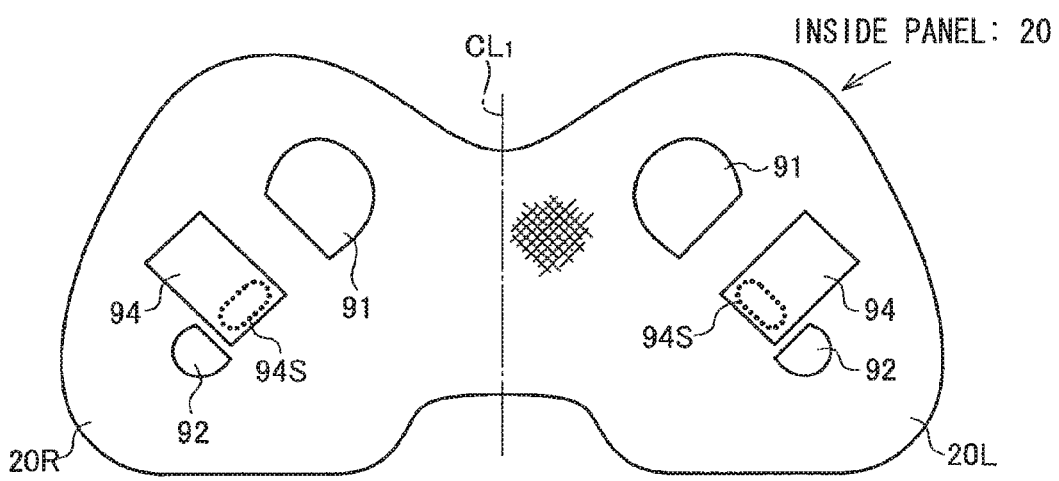

The inside panel 20 and the outside panel 80, as shown in FIGS. 18A and 18B are preferably symmetrical in shape when spread horizontally flat on a flat surface. The thread line of the left side 20L (in the direction the base fabric thread extends) and the thread line of the right side 20R are 0° and 90° (refer to FIG. 18A) or 45° (refer to FIG. 18B) with respect to a centerline (vertical line that passes through the lateral middle of the inside panel 20) $CL_1$ of the inside panel 20.

Similarly, the thread line of the outside panel 80 is 0° and 90° (refer to FIG. 19A) or 45° (refer to FIG. 19B) with respect to a centerline (vertical line that passes through the lateral middle of the outside panel 80) $CL_2$ of the outside panel 80.

With the thread lines of the panels 20 and 80 being symmetrical, the levels of strength of the left half airbag 14 and the right half airbag 12 are equalized.

Figure 19A:
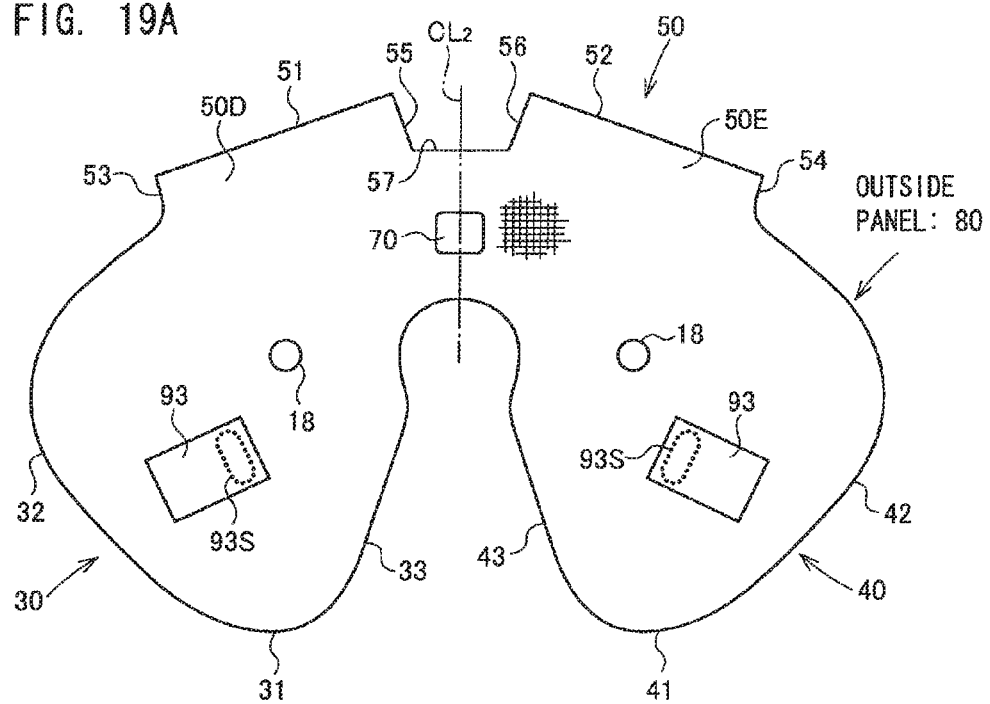
FIG. 19 is a plane view showing the thread line direction of the outside panel.
Figure 19B:
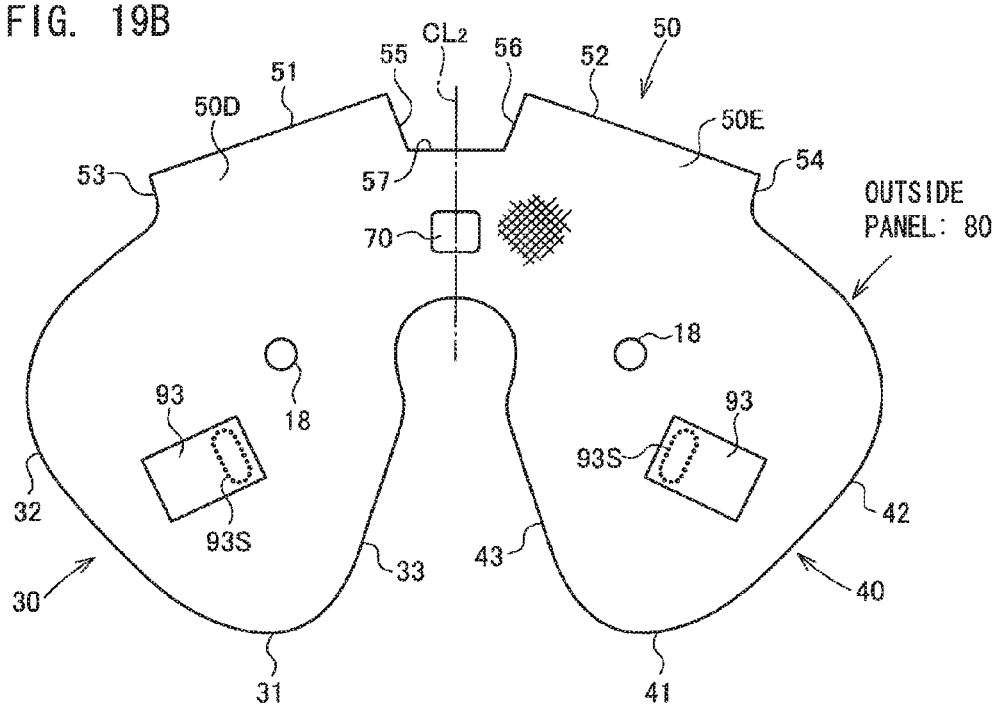

When both of the panels 20 and 80 are designed so that the thread lines are in the same direction (preferably 0° and 90° with respect to the centerlines $CL_1$ and $CL_2$, respectively, and both of the panels 20 and 80 are spread flat as shown in FIG. 18A and FIG. 19A and placed on top of each other, the thread lines of both of the panels 20 and 80 become parallel to each other.

Figure 20A:
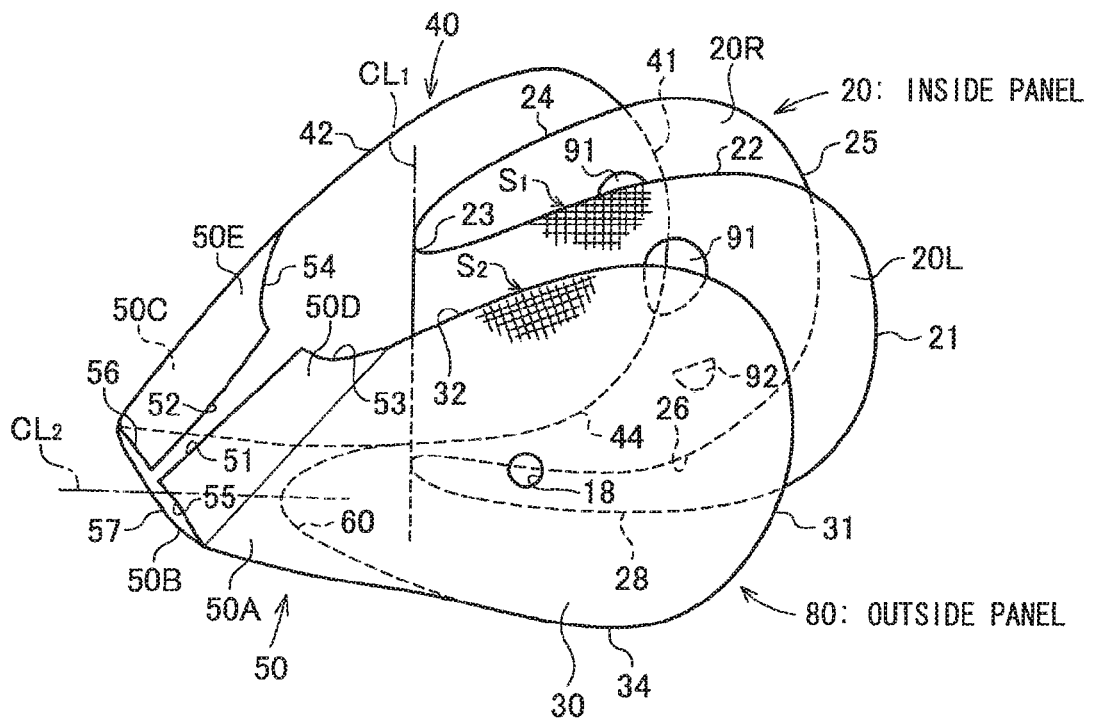
FIG. 20 is an exploded perspective view of the inside panel and the outside panel, and a plane view in the vicinity of the stitching portion of the inside panel outer periphery and the outside panel outer periphery.

In the above embodiment, as shown in FIG. 20A, the inside panel 20 is folded in two along the centerline $CL_1$ (flat fold) when manufacturing the airbag 10. Conversely, the outside panel 80 is folded (three-dimensionally) so that the mouth surface 50 on the base-end side has the bottom 50B, the left/right side surfaces 50A and 50C, and an upper surface (the flaps 50D and 50E), thereby forming a rectangular shape that has a surface open to the front end of the airbag.

Figure 20B:
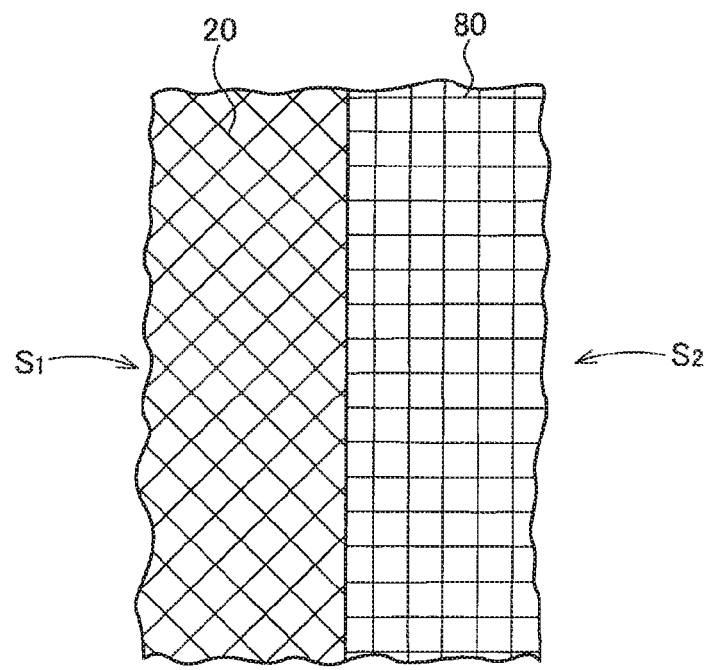

With this arrangement, in the above embodiment, as described above, even if the thread line directions of both of the panels 20 and 80 are in the same direction with respect to the centerlines $CL_1$ and $CL_2$, respectively, as shown in FIG. 20B, the outer periphery of the panel 20 and the outer periphery of the panel 80 overlap with the thread lines in different directions (non-parallel directions). With the panels 20 and 80 thus stitched together with the thread lines in non-parallel directions, the stitch strength of the panels 20 and 80 is higher compared to a case where stitching is performed with the thread lines parallel.

Furthermore, with the panels 20 and 80 having thread lines at 0° and 90° with respect to the centerlines $CL_1$ and $CL_2$, the unused parts that remain when the base cloth is cut out from the band of fabric (cloth) are minimized, thereby improving cutout efficiency. That is, the number of panels 20 and 80 that can be cut out from the cloth of a unit length increases.

What is claimed is:

1. An airbag comprising:
   a vertically extended concave portion formed so as to face a front-passenger seat occupant in an inflated state in front of the occupant;
   a base-end chamber disposed on a vehicle front side;
   a left half airbag that is continuous with said base-end chamber and is to be inflated on a front left side of the occupant; and
   a right half airbag that is continuous with said base-end chamber and is to be inflated on a front right side of the occupant;

an upper joining portion that joins an upper part of said left half airbag to an upper part of said right half airbag on a vehicle rear side among mutually face-to-face portions of the left half airbag and the right half airbag; and a lower joining portion that joins a lower part of said left half airbag to a lower part of said right half airbag on a vehicle rear side among mutually face-to-face portions of the left half airbag and the right half airbag;

said upper joining portion and said lower joining portion being discontinuous; and wherein the airbag further comprises:

at least one tether for decreasing a width of said left half airbag and a width of said right half airbag along a lateral direction when said left half airbag and right half airbag are inflated, wherein:

an end portion of said tether at an airbag center side is stitched by a seam to said left half airbag and said right half airbag; and said left half airbag and said right half airbag are partly joined between said upper joining portion and said lower joining portion by said seam.

2. The airbag according to claim 1, further comprising at least one opening that connects said upper part of said left half airbag with said upper part of said right half airbag on a vehicle rear side and at least one other opening that connects said lower part of said left half airbag with said lower part of said right half airbag on the vehicle rear side.

3. The airbag according to claim 1, wherein:

in said inflated state, a shallowest depth $d_1$ of said concave portion from a surface of said airbag facing the occupant in an upper part of the concave portion is 5 to 200 mm; and in said inflated state, a shallowest depth $d_3$ of said concave portion from the surface facing the occupant in a lower part of the concave portion is 5 to 200 mm.

4. The airbag according to claim 1, wherein:

in said inflated state, a depth $d_2$ from the surface of said airbag facing the occupant to said seam is 20 to 400 mm greater than both said shallowest depth $d_1$ of the upper part of said concave portion and said shallowest depth $d_3$ of the lower part of said concave portion.

5. The airbag according to claim 1, wherein:

said left half airbag and said right half airbag are configured to be pressed together closer to a vehicle front side than said concave portion between said upper joining portion and said lower joining portion, in said inflated state.

6. The airbag according to claim 1, further comprising a hollow portion that passes in the substantially vertical direction through said airbag in the inflated state that said airbag inflates from an instrument panel of the vehicle toward a vehicle rear so as to approach the occupant; wherein:

said hollow portion is configured so that, when said airbag is in said inflated state, at least one portion of a lower end side of said hollow portion is positioned closer to a vehicle rear than an end portion of the instrument panel on a vehicle rear side.

7. An airbag device having the airbag according to claim 1, further comprising an inflator that inflates said airbag.

8. A vehicle having the airbag device according to claim 7.

* * * * *